United States Patent Office 3,824,290
Patented July 16, 1974

3,824,290
ALIPHATIC HYDROCARBON 2,4-DIENAMINES
Clive A. Henrick, Palo Alto, Calif., assignor to Zoecon Corporation, Palo Alto, Calif.
No Drawing. Continuation-in-part of application Ser. No. 187,898, Oct. 8, 1971, now Patent No. 3,752,843, which is a continuation-in-part of abandoned application Ser. No. 111,673, Feb. 1, 1971. This application Dec. 9, 1971, Ser. No. 206,519
Int. Cl. C07c 87/24
U.S. Cl. 260—583 H          9 Claims

ABSTRACT OF THE DISCLOSURE

Aliphatic hydrocarbon 2,4-diene amines, intermediates therefor, syntheses thereof and their use for the control of insects.

---

This is a continuation-in-part of Ser. No. 187,898, filed Oct. 8, 1971, now U.S. Patent No. 3,752,843, which is in turn, a continuation-in-part of Ser. No. 111,673, filed Feb. 1, 1971, now abandoned, the disclosures of which are incorporated by reference.

This invention relates to novel aliphatic di-olefinic compounds, intermediates therefor, synthesis thereof and the control of insects. More particularly, novel di-olefinic compounds of the present invention are represented by the following formula (A):

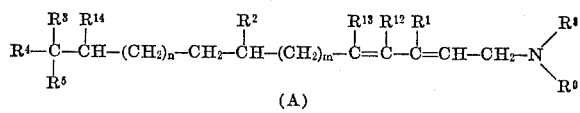

(A)

wherein, each of $m$ and $n$ is zero or the positive integer one, two or three;
each of $R^1$ and $R^2$ is lower alkyl;
$R^4$ is alkyl;
each of $R^3$, $R^5$, $R^{12}$, $R^{13}$ and $R^{14}$ is hydrogen or lower alkyl; and
each of $R^8$ and $R^9$ is hydrogen, alkyl, alkenyl, cycloalkyl, hydroxyalkyl, alkoxyalkyl, aryl, aralkyl, or when taken together with the nitrogen atom to which they are attached, pyrrolidino, morpholino, piperidino, piperazino or 4-alkylpiperazino.

The compounds of formula A are useful for the control of insects. The utility of these compounds as insects control agents is believed to be attributable to their juvenile hormone activity. They are preferably applied to the immature insects, namely—during the embryo, larvae or pupae stage in view of their effect on metamorphosis and otherwise cause abnormal development leading to death or inability to reproduce. These compounds are effective control agents for Hemipteran such as Lygaeidae, Miridae and Pyrrhocoridae; Lepidopteran such as Pyralidae, Noctuidae and Gelechiidae; Coleopteran such as Tenebrionidae, Crysomelidae and Dermestidae; Dipteran such as mosquitos, flies, Homopteran such as aphids and other insects. The compounds can be applied at low dosage levels of the order of 0.001 μg. to 25.0 μg. per insect. Suitable carrier substances include liquid or solid carriers, such as water, acetone, xylene, mineral or vegetable oils, talc, vermiculite, natural and synthetic resins and silica. Treatment of insects in accordance with the present invention is accomplished by spraying, dusting or exposing the insects to the vapor of the compounds of formula A. Generally, a concentration of less than 25% of the active compound is employed. The formulations can include insect attractants, emulsifying agents or wetting agents to assist in the application and effectiveness of the active ingredient. In the application of the compounds, there is generally employed a mixture of the C-2,3 trans and cis isomers.

In the description hereinafter, each of $R^1$–$R^5$, $R^8$, $R^9$, $R^{12}$–$R^{14}$, $m$ and $n$ is as defined hereinabove, unless otherwise specified.

The amines of formula A can be prepared by the reaction of an allylic halide of formula C with an amine of formula D which can be outlined as follows (X is bromo, chloro or iodo):

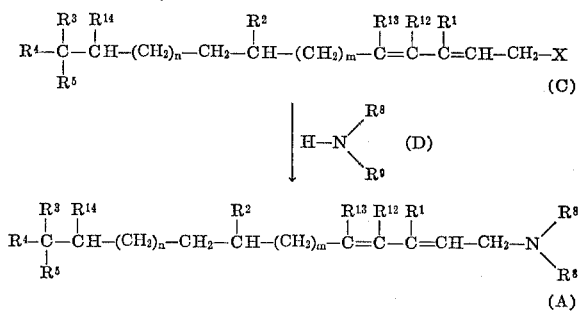

The allylic halides of formula C can be prepared by the halogenation of an allylic alcohol of formula E which is obtained by the reduction of an α,β-unsaturated acid or ester of formula B ($R^7$ is hydrogen or lower alkyl)

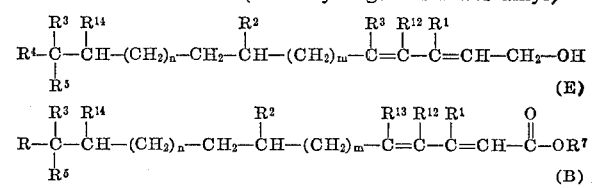

The ester and acid precursors of formula B can be prepared as described in application Ser. No. 187,898, filed Oct. 8, 1971, the disclosure of which is incorporated by reference. One synthesis of esters of formula B is outlined as follows wherein R is lower alkyl, cycloalkyl or phenyl and $R^6$ is lower alkoxy.

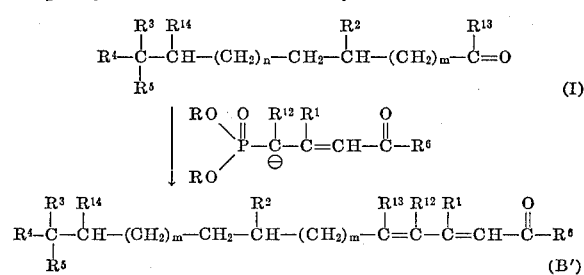

In the above synthesis, an aldehyde ($R^{13}$ is hydrogen) or ketone ($R^{13}$ is lower alkyl) of formula I is reacted with a carbanion of formula II to yield an ester of formula B'.

The carbanion(II) is generated by treatment of the corresponding phosphonate with a base such as an alkali hydroxide, allali hydride or alkali alkoxide, e.g. NaOH, NaH, sodium ethoxide or sodium methoxide, in an organic solvent inert to the reaction such as hydrocarbon, ether or dialkylsulfoxide solvent e.g. benzene, toluene, dimethylformamide or tetrahydrofuran. The reaction is generally conducted at a temperature of from about −20° C. to room temperature or above: The reaction of the carbanion with the carbonyl(I) is generally conducted at temperature of about 0° C. to room temperature or above. The phosphonates can be prepared as described by Pattenden and Weedon, *J. Chem. Soc.* (C), 1984 and 1997 (1968), Stilz and Pommer, U.S. Pats. 3,163,669 and 3,177,226 and Corey et al., *Tetrahedron Letters*, No. 2, 1821 (1971).

The term "cycloalkyl," as used herein, refers to a cyclic alkyl group of four to eight carbon atoms. The term "aralkyl" refers to a monovalent hydrocarbon group in which an aryl group is substituted for a hydrogen atom of an alkyl group, such as benzyl, xylyl, mesityl, phenylethyl, methylbenzyl, naphthylmethyl and naphthylethyl containing up to twelve carbon atoms. The term "aryl," as used herein, refers to an aromatic group of up to twelve carbon atoms. Typical aromatic groups include phenyl, naphthyl, lower alkylphenyl such as methylphenyl, ethylphenyl, t-butylphenyl and isopropylphenyl, lower alkylthiophenyl such as methylthiophenyl, ethylthiophenyl and isopropylthiophenyl, lower alkoxyphenyl such as methoxyphenyl and ethoxyphenyl, halophenyl such as chlorophenyl, bromophenyl, iodophenyl and fluorophenyl, nitrophenyl, methylene-dioxyphenyl, lower alkenylphenyl such as vinylphenyl and allylphenyl, phenylketones such as acetophenon, benzoic esters such as lower alkyl benzoate and benzamides and N-lower alkyl benzamide and N,N-di (lower alkyl) benzamide. In the case of substituted phenyl, the substituent such as lower alkyl, lower alkylthio, lower alkoxy, halo, nitro, lower alkenyl, carbonyl, lower alkoxycarbonyl, cyano, and amido can be in one or more positions of the phenyl ring, usually in the para position.

The term "hydroxyalkyl," as used herein, refers to an alkyl group substituted with one hydroxy group, e.g. hydroxymethyl, p-hydroxyethyl and 4-hydroxypentyl. The term "alkoxyalkyl," as used herein, refers to an alkyl group substituted with one alkoxy group, e.g. methoxymethyl, 2 - methoxyethyl, 4 - ethoxybutyl, n-propoxyethyl and t-butoxyethyl. The term "alkenyl," as used herein, refers to an ethylenically unsaturated hydrocarbon group, branched or straight chain, having a chain length of two to twelve carbon atoms, e.g. allyl, vinyl, 3-butenyl, 2-hexenyl and i-propenyl. Whenever any of the foregoing terms are modified by the word "lower," the chain length of the group is not more than six carbon atoms with the exception of lower alkoxyalkyl, in which event a total chain length of twelve carbon atoms is the maximum.

The term "alkyl" refers to a saturated aliphatic hydrocarbon of one to twelve carbon atoms. The term "lower alkyl" refers to an alkyl group having a chain length of one to six carbon atoms.

The presence of an olefinic bond at position C–2 and C–4 gives rise to four isomers, each of which is embraced by the present invention. As mentioned above, a mixture of isomers is suitably employed for the control of insects such as a mixture containing the trans(2), trans(4) isomer and the cis(2), trans(4) isomer.

In the specific examples hereinafter, when isomerism is not specified, it is understood to include a mixture of isomers which, if desired, can be separated using known separation methods. Hereafter, when only one designation of configuration is given, the designation refers to position C–2,3 and the configuration is taken to be trans at position C–4,5 when not otherwise specified. The use of "trans/cis" and "cis/trans" is with reference to position C–2,3 and indicates a mixture of isomers.

The following examples are provided to illustrate the practice of the present invention. Temperature is given in degrees Centigrade.

EXAMPLE 1

Sodium methoxide (from 200 mg. sodium and 12 ml. methanol) is added dropwise to a stirred solution of 1.8 g. of trans diethyl 3-ethoxycarbonyl-2-methylprop-2-enyl phosphonate (II; R=ethyl, $R^1$=methyl and $R^6$=ethoxy) and 1 g. of 3,7 - dimethyl - 1 - nonanal in 50 ml. of dimethylformamide under nitrogen. The reaction mixture is left for one hour at room temperature and then water is added followed by extraction with ether. The ethereal extracts are washed with brine, dried and evaporated to yield trans/cis methyl 3,7,11 - trimethyltrideca-2,4-dienoate. The isomeric mixture can be chromatographed on silica or distilled for purification. The isomeric mixture is predominantly trans at C–2,3.

The foregoing procedure is repeated using ethyl 3-methoxycarbonyl - 2 - methylprop - 2 - enyl phosphonate and each of
3-methyl-7-ethylnonan-1-al,
3,7-diethylnonan-1-al,
3,6,7-trimethyloctan-1-al,
3,7,8-trimethylnonan-1-al,
3-methyloctan-1-al,
3,6,7-trimethylnonan-1-al and
2,4,5-trimethylhexan-1-al to prepare
methyl 3,7-dimethyl-11-ethyltrideca-2,4-dienoate,
methyl 3-methyl-7,11-diethyltrideca-2,4-dienoate,
methyl 3,7,10,11-tetramethyldodeca-2,4-dienoate,
methyl 3,7,11,12-tetramethyltrideca-2,4-dienoate,
methyl 3,7-dimethyldodeca-2,4-dienoate,
methyl 3,7,10,11-tetramethyltrideca-2,4-dienoate and
methyl 3,6,8,9-tetramethyldeca-2,4-dienoate, respectively.

The foregoing procedure is repeated using sodium ethoxide in place of sodium methoxide to yield trans/cis ethyl 3,7,11-trimethyltrideca-2,4-dienoate.

EXAMPLE 2

To a mixture of 250 mg. of sodium hydride in 2 ml. of tetrahydrofuran, with ice-cooling, is added 1.6 g. of trans diethyl 3 - ethoxycarbonyl - 2 - methylprop - 2 - enyl phosphonate in 5 ml. of tetrahydrofuran. Temperature is allowed to rise to room temperature and after 30 minutes, 0.95 g. of 3 - ethyl - 7 - methyl - 1 - nonanal is added. After about one hour at room temperature, the mixture is extracted with ether. The ethereal extracts are washed with brine, dried and evaporated to yield trans/cis ethyl 3,11-dimethyl-7-ethyl-trideca - 2,4 - dienoate (about 1:1 mixture of C–2,3 trans and cis isomers).

EXAMPLE 3

To 125 mg. of a 57% dispersion of sodium hydride in oil is added pentane. The pentane is removed and the sodium hydride washed several times with pentane. To the washed sodium hydride is added 582 mg. of diethyl acetylmethylphosphonate (IIA; R is ethyl, $R^1$ is methyl) in 5 ml. of tetrahydrofuran at −10° under argon. After several minutes, the solution is transferred to a solution of 425 mg. of 3,7-dimethyloctan-1-al in about 4 ml. of dry tetrahydrofuran under argon over a period of about 20 minutes at room temperature. After about two hours, water is added followed by addition of ether and the layers separated. The organic layer is washed with saturated sodium chloride, dried over sodium sulfate and evaporated under reduced pressure to yield 6,10-dimethylundec-3-en-2-one.

EXAMPLE 4

32.3 grams of sodium hydride (57% in oil) is placed in a dry, one liter, 3-neck flask (fitted with a nitrogen inlet) and washed three times (100 ml. each) with dry pentane under nitrogen, carefully decanting only the solvent each time, into a beaker of ethanol. 400 milliliters dry tetrahydrofuran is then added, the mixture cooled to 0°, and 156.0 g. of diethyl carbethoxymethyl phosphonate is added under nitrogen. The solution is stirred for 0.5 hour after addition is complete, and then 120 g. of 6,10-dimethyl-undec-3-en-one in 250 ml. dry tetrahydrofuran is added over about 0.5 hour period at room temperature under nitrogen. The mixture is stirred overnight at 60° and then poured into saturated NaCl at 0° and extracted with ether (3× 200 ml.), the organic layers dried (CaSO$_4$) and concentrated under reduced pressure to yield trans/cis ethyl 3,7,11-trimethyldodeca-2,4-dienoate which can be separated into the individual C–2,3 trans and cis isomers using gas-liquid chromatography or fractional distillation.

EXAMPLE 5

A mixture of 1 g. of trans/cis methyl 3,7,11-trimethyldodeca-2,4-dienoate, 60 ml. of methanol, 0.5 g. of sodium hydroxide and 6 ml. of water is stirred at about 30° for about 56 hours. The mixture is then diluted with water, neutralized and extracted with ether. The organic phase is washed with water, dried over sodium sulfate and evaporated to yield trans/cis 3,7,11-trimethyldodeca-2,4-dienoic acid.

EXAMPLE 6

To 1.6 g. of sodium hydride (57% in oil dispersion) in a 500 ml., 3-neck flask, fitted with a nitrogen inlet, is added 25 to 50 ml. of dry hexane or pentane and the mixture swirled under nitrogen. The NaH is allowed to settle and the solvent carefully decanted into a beaker containing ethanol. This rinsing process is repeated twice and 1000 ml. of dry tetrahydrofuran is added via syringe or pipet. Mixture is cooled in an ice-bath and 9.0 g. of triethyl phosphonoacetate (dried over molecular seives) is added via addition funnel over a 10 minute period. Stir an additional one-half hour. The solution of the above anion is transferred via syringe to a 125 ml. addition funnel (with pressure equalizing arm) and is added over about one hour to 6.73 g. of 6,10-dimethyldodec-3-en-2-one at room temperature with stirring. The homogeneous solution is then refluxed overnight (18–24 hours). The mixture is then poured into saturated sodium chloride at 0° and extracted with ether. The organic phase is dried and concentrated under reduced pressure to yield trans/cis ethyl 3,7,11-trimethyltrideca-2,4-dienoate which can be purified by chromatography or distillation.

EXAMPLE 7

41 grams of 3,7-dimethyloctan-1-al and 80 g. recrystallized (ethyl acetate) triphenylphosphineacetylmethylene [Ramirez et al., *J. Org. Chem.* 22, 41 (1957)] are refluxed in one liter of dry toluene for 18 hours, under nitrogen. Most of the solvent is removed *in vacuo*, 500 ml. pentane is added and the mixture filtered. The flask and the triphenylphosphine oxide filter cake are worked several times with pentane. The filtrate is concentrated *in vacuo* to yield 6,10-dimethylundec-3-en-2-one.

By use of the foregoing Wittig reaction, other aldehydes of formula I are converted into the corresponding mono unsaturated ketones of formula III.

EXAMPLE 8

One gram of triphenylphosphineacetylmethylene and 425 mg. of 3,7-dimethylnonan-1-al are dissolved in 10 ml. toluene and refluxed under nitrogen overnight. The toluene is distilled off and the formed triphenylphosphine oxide crystallized by addition of pentane. Filtration and evaporation of the pentane gives a residue, which is further purified by preparative, thin-layer chromatography, with the plate eluted with 15% ethyl acetate: hexane. Removal of the UV active band gives 6,10-dimethyldodec-3-en-2-one.

EXAMPLE 9

To a mixture of one g. of 3,7-dimethyl-1-octanal and 1.5 g. of phosphonate (II; R is ethyl, $R^1$ is methyl, $R^6$ is ethoxy) and 50 ml. of dimethylformamide, under nitrogen, is slowly added sodium ethoxide (prepared from 200 mg. of sodium and 12 ml. of ethanol). The mixture is allowed to stand at room temperature for one hour and then is worked up with ether. The ethereal extracts are dried, concentrated and then chromatographed on silica plates eluting with hexane/ether (5% ether) to yield ethyl 3,7,11-trimethyldodeca-2,4-dienoate which is predominantly trans at position C–2,3.

EXAMPLE 10

Following the procedure of Example 2 or 9 each of the aldehydes under column I is reacted with the carbanion of diethyl 3 - ethoxycarbonyl-2-methylprop-2-enyl phosphonate to produce the correspondong ethyl esters under column II.

I 3,7-dimethyloctan-1-al
3,7-dimethylnonan-1-al
3-ethyl-7-methylnonan-1-al
3,6-dimethylheptan-1-al
2,5-dimethylhexan-1-al
2,5-dimethylheptan-1-al
4,8-dimethylnonan-1-al
4,9-dimethyldecan-1-al
3,9-dimethyldecan-1-al

II ethyl 3,7,11-trimethyldodeca-2,4-dienoate
ethyl 3,7,11-trimethyltrideca-2,4-dienoate
ethyl 3,11-dimethyl-7-ethyltrideca-2,4-dienoate
ethyl 3,7,10-trimethylundeca-2,4-dienoate
ethyl 3,6,9-trimethyldeca-2,4-dienoate
ethyl 3,6,9-trimethylundeca-2,4-dienoate
ethyl 3,8,12-trimethyltrideca-2,4-dienoate
ethyl 3,8,13-trimethyltetradeca-2,4-dienoate
ethyl 3,7,13-trimethyltetradeca-2,4-dienoate

EXAMPLE 11

Each of the esters under column II is hydrolyzed using the procedure of Example 5 or by refluxing for about 20 hours to produce the corresponding free acid under column III.

III 3,7,11-trimethyldodeca-2,4-dienoic acid
3,7,11-trimethyltrideca-2,4-dienoic acid
3,11-dimethyl-7-ethyltrideca-2,4-dienoic acid
3,7,10-trimethylundeca-2,4-dienoic acid
3,6,9-trimethyldeca-2,4-dienoic acid
3,6,9-trimethylundeca-2,4-dienoic acid
3,8,12-trimethyltrideca-2,4-dienoic acid
3,8,13-trimethyltetradeca-2,4-dienoic acid
3,7,13-trimethyltetradeca-2,4-dienoic acid

EXAMPLE 12

Each of the aldehydes under column I is used as the aldehyde starting material in the procedure of Example 3, 7 or 8 to produce the corresponding ketone under column IV.

IV 6,10-dimthylundec-3-en-2-one
6,10-dimthyldodec-3-en-2-one
6-ethyl-10-methyldodec-3-en-2-one
6,9dimethyldec-3-en-2-one
5,8-dimethylnon-3-en-2-one
5,8-dimethyldec-3-en-2-one
7,11-dimethyldodec-3-en-2-one
7,12-dimethyltridec-3-en-2-one
6,12-dimethyltridec-3-en-2-one

EXAMPLE 13

Each of the ketones under column IV is converted into the corresponding methyl ester under column V using the procedure of Example 4 or 6.

V methyl 3,7,11-trimethyldodeca-2,4-dienoate
methyl 3,7,11-trimethyltrideca-2,4-dienoate
methyl 3,11-dimethyl-7-ethyltrideca-2,4-dienoate
methyl 3,7,10-trimethylundeca-2,4-dienoate
methyl 3,6,9-trimethyldeca-2,4-dienoate
methyl 3,6,9-trimehtylundeca-2,4-dienoate
methyl 3,8,12-trimethyltrideca-2,4-dienoate
methyl 3,8,12-trimethyltetradeca-2,4-dienoate
methyl 3,7,13-trimethyltetradeca-2,4-dienoate Each of the methyl esters under column V is hydrolyzed to the free acid using the procedure of Example 5 or by refluxing for several hours.

EXAMPLE 14

Following the procedure of either Example 1, 2 or 9, each of the aldehydes under column VII is converted into the respective ester under column VIII.

VII 3,7,7-trimethyloctan-1-al
3,7,7-trimethylnonan-1-al
3,6,6-trimethylheptan-1-al
3,8,8-trimethylnonan-1-al
4,8,8-trimethylnonan-1-al

VIII ethyl 3,7,11,11-tetramethyldodeca-2,4-dienoate
ethyl 3,7,11,11-tetramethyltrideca-2,4-dienoate
ethyl 3,7,10,10-tetramethylundeca-2,4-dienoate
ethyl 3,7,12,12-tetramethyltrideca-2,4-dienoate
ethyl 3,8,12,12-tetramethyltrideca-2,4-dienoate

EXAMPLE 15

The aldehydes under column VII are used as the starting material in the process of Example 3, 7 or 8 to prepare the respective ketone under column IX.

IX 6,10,10-trimethylundec-3-en-2-one
6,10,10-trimethyldodec-3-en-2-one
6,9,9-trimethyldec-3-en-2-one
6,11,11-trimethyldodec-3-en-2-one
7,11,11-trimethyldodec-3-en-2-one

EXAMPLE 16

Sodium ethoxide (9 g. sodium in 600 ml. of ethanol) is added slowly to a mixture of 42 g. of dihydrocitronellal and 75 g. of diethyl 3-ethoxycarbonyl-2-methylprop-2-enyl phosphonate (about 49% trans) in one liter of dimethylformamide, under nitrogen and at 0°, with stirring. The mixture is allowed to stand overnight at about 5° and the reaction worked up by extraction with ether, washing with water and brine and filtering through Florisil to yield ethyl 3,7,11-trimethyldodeca-2,4-dienoate as a cis/trans mixture, mostly trans,trans.

EXAMPLE 17

Sodium methoxide (1.2 g. of sodium and 30 ml. of methanol) is added slowly to a mixture of 5 g. of dihydrocitronellal and 10 g. of diethyl 3-methoxycarbonyl-2-methylprop-2-enyl phosphonate (about 77% trans) in 50 ml. of dimethylformamide, under nitrogen and at about 0°, with stirring. After addition is complete, the reaction is left three hours at room temperature and then worked up by extraction with hexane/ether to yield cis/trans methyl 3,7,11-trimethyldodeca-2,4-dienoate, mostly the trans,trans isomer.

EXAMPLE 18

To a mixture of 1.5 g. of dihydrocitronellal, 2.7 g. of diethyl 3-ethoxycarbonyl-2-methylprop-2-enyl phosphonate and 5 ml. of dimethylformamide, under nitrogen and at 0°, with stirring, is added slowly sodium methoxide (250 mg. sodium and 5 ml. of methanol). After addition is complete, the reaction is left two hours at room temperature and then worked up by extraction with ether/hexane to yield methyl 3,7,11 - trimethyldodeca - 2,4-dienoate.

EXAMPLE 19

To a mixture of 30 g. of dihydrocitronellal, 44 g. of diethyl 3-ethoxycarbonyl-2-ethylprop-2-enyl phosphonate and 200 ml. of dimethylformamide, under nitrogen at 0° and with stirring, is added slowly sodium ethoxide (4.6 g. sodium in 100 ml. of ethanol). After addition is complete, the reaction is left at room temperature for two hours and then worked up by extraction with hexane to yield ethyl 3-ethyl-7,11-dimethyldodeca-2,4-dienoate.

EXAMPLE 20

By use of the procedures hereinabove, see Examples 16 and 17, for example, each of the aldehyde under column XVIII is reacted with the carbanion of diethyl 3-ethoxycarbonyl-2-methylprop-2-enyl phosphonate to prepare the respective ethyl ester under column XIX.

XVIII 3,7-dimethyldecan-1-al
3,7-dimethylundecan-1-al
3,5,6-trimethylheptan-1-al
3,8-dimethylnonan-1-al
2,6-dimtheylheptan-1-al
4,7,8-trimethylnonan-1-al
4,8-dimethyldecan-1-al
2,9-dimethyldecan-1-al
2,5,6-trimethylheptan-1-al
2,6,6-trimethylheptan-1-al
2,5,5-trimethylhexan-1-al

XIX ethyl 3,7,11-trimethyltetradeca-2,4-dienoate
ethyl 3,7,11-trimethylpentadeca-2,4-dienoate
ethyl 3,7,9,10-tetramethylundeca-2,4-dienoate
ethyl 3,7,12-trimethyltrideca-2,4-dienoate
ethyl 3,6,10-trimethylundeca-2,4-dienoate
ethyl 3,8,11,12-tetramethyltrideca-2,4-dienoate
ethyl 3,8,11-trimethyltetradeca-2,4-dienoate
ethyl 3,6,13-trimethyltetradeca-2,4-dienoate
ethyl 3,6,9,10-tetramethylundeca-2,4-dienoate
ethyl 3,6,10,10-tetramethylundeca-2,4-dienoate
ethyl 3,6,9,9-tetramethyldeca-2,4-dienoate

EXAMPLE 21

(A) Eighty ml. of a 3M solution of methylmagnesium bromide in ether is added slowly to 31 g. of dihydrocitronellal in 250 ml. of dry ether. The mixture is heated at reflux for about one hour, cooled to 0° and treated with saturated aqueous ammonium chloride until reaction subsides. The organic layer is separated and the aqueous layer extracted with ether. The organic layer and ether extracts are combined, washed with water and brine and dried over magnesium sulfate. Evaporation of the solvent gives 4,8-dimethylnonan-2-ol.

(B) A solution of 47 g. of 4,8-dimethylnonan-2-ol in 250 ml. of methylene chloride is cooled to about 10° as a solution of 46.4 g. of sodium dichromate in 125 ml. of water is added. The mixture is maintained at about 10° as a solution of 46.3 g. of sulfuric acid in 100 ml. of water is added over about 45 minutes. The mixture is allowed to attain room temperature and, after about 3 hours, the organic layer is separated and the aqueous layer is extracted with methylene chloride. The combined organic materials are washed with saturated potassium bicarbonate, water and saturated sodium chloride, dried over magnesium sulfate and evaporated to yield 4,8-dimethylnonan-2-one.

The Grignard reaction of part A is repeated using each of 3,7-dimethylnonan - 1 - al, 3-methyl-7-ethylnonan-1-al, 3,7,7-trimethyloctan-1-al, 3,7,7-trimethylnonan-1-al, 3,6,7-trimethyloctan - 1 - al, 3,7,8-trimethylnonan-1-al, 2,4,5-trimethylhexan-1-al, 2,5-dimethylhexan-1-al, 3,5,6-trimethylheptan-1-al, 3,6-dimethylheptan-1-al, 2,6-dimethylheptan-1-al and 2,5,6-trimethylheptan-1-al in place of dihydrocitronellal to yield the respective secondary alcohol:

4,8-dimethyldecan-2-ol
4-methyl-8-ethyldecan-2-ol
4,8,8-trimethylnonan-2-ol
4,8,8-trimethyldecan-2-ol
4,7,8-trimethylnonan-2-ol
4,8,9-trimethyldecan-2-ol
3,5,6-trimethylheptan-2-ol
3,6-dimethylheptan-2-ol 4,6,7-trimethyloctan-2-ol
4,7-dimethyloctan-2-ol
3,7-dimethyloctan-2-ol
3,6,7-trimethyloctan-2-ol Each of the above alcohols is oxidized to prepare the respective ketone:

4,8-dimethyldecan-2-one
4-methyl-8-ethyldecan-2-one
4,8,8-trimethylnonan-2-one
4,8,8-trimethyldecan-2-one
4,7,8-trimethylnonan-2-one
4,8,9-trimethyldecan-2-one
3,5,6-trimethylheptan-2-one
3,6-dimethylheptan-2-one
4,6,7-trimethyloctan-2-one
4,7-dimethyloctan-2-one
3,7-dimethyloctan-2-one
3,6,7-trimethyloctan-2-one (C) Each of the ketones of part B is reacted with the carbanion of diethyl 3-ethoxycarbonyl-2-methylprop-2-enyl phosphonate according to procedures described above to prepare the respective 2,4-dienoate i.e.

ethyl 3,5,7,11-tetramethyldodeca-2,4-dienoate
ethyl 3,5,7,11-tetramethyltrideca-2,4-dienoate
ethyl 3,5,7-trimethyl-11-ethyltrideca-2,4-dienoate
ethyl 3,5,7,11,11-pentamethyldodeca-2,4-dienoate
ethyl 3,5,7,11,11-pentamethyltrideca-2,4-dienoate
ethyl 3,5,7,10,11-pentamethyldodeca-2,4-dienoate
ethyl 3,5,7,11,12-pentamethyltrideca-2,4-dienoate
ethyl 3,5,6,8,9-pentamethyldeca-2,4-dienoate
ethyl 3,5,6,9-tetramethyldeca-2,4-dienoate
ethyl 3,5,7,9,10-pentamethylundeca-2,4-dienoate
ethyl 3,5,7,10-tetramethylundeca-2,4-dienoate
ethyl 3,5,6,10-tetramethylundeca-2,4-dienoate
ethyl 3,5,6,9,10-pentamethylundeca-2,4-dienoate

EXAMPLE 22

(A) Each of the ketones of part B of Example 21 is reacted with the carbanion of diethyl 3-ethoxycarbonyl-1,2-dimethyl-prop-2-enylphosphonate to prepare the respective 2,4-dienoate, i.e.

ethyl 3,4,5,7,11-pentamethyldodeca-2,4-dienoate
ethyl 3,4,5,7,11-pentamethyltrideca-2,4-dienoate
ethyl 3,4,5,7-tetramethyl-11-ethyltrideca-2,4-dienoate
ethyl 3,4,5,7,11,11-hexamethyldodeca-2,4-dienoate
ethyl 3,4,5,7,11,11-hexamethyltrideca-2,4-dienoate
ethyl 3,4,5,7,10,11-hexamethyldodeca-2,4-dienoate
ethyl 3,4,5,7,11,12-hexamethyltrideca-2,4-dienoate
ethyl 3,4,5,6,8,9-hexamethyldeca-2,4-dienoate
ethyl 3,4,5,6,9-pentamethyldeca-2,4-dienoate
ethyl 3,4,5,7,9,10-hexamethylundeca-2,4-dienoate
ethyl 3,4,5,7,10-pentamethylundeca-2,4-dienoate
ethyl 3,4,5,6,10-pentamethylundeca-2,4-dienoate
ethyl 3,4,5,6,9,10-hexamethylundeca-2,4-dienoate (B) Each of the aldehydes under col. I is reacted with the carbanion of diethyl 3-ethoxycarbonyl-1,2-dimethyl-prop-2-enyl phosphonate to prepare the respective 2,4-dienoate, i.e.

ethyl 3,4,7,11-tetramethyldodeca-2,4-dienoate
ethyl 3,4,7,11-tetramethyltrideca-2,4-dienoate
ethyl 3,4,11-trimethyl-7-ethyltrideca-2,4-dienoate
ethyl 3,4,7,10-tetramethylundeca-2,4-dienoate
ethyl 3,4,6,9-tetramethyldeca-2,4-dienoate
ethyl 3,4,6,9-tetramethylundeca-2,4-dienoate
ethyl 3,4,8,12-tetramethyltrideca-2,4-dienoate
ethyl 3,4,8,13-tetramethyltetradeca-2,4-dienoate
ethyl 3,4,7,13-tetramethyltetradeca-2,4-dienoate By use of the procedure of part B of this example, other aldehydes of formula I ($R^{13}$ is hydrogen) are converted and $R^{12}$ is methyl or other lower alkyl. Similarly following the procedure of part A of this example, other ketones of formula I ($R^{13}$ is lower alkyl) are converted into esters of formula B′ wherein each of $R^{12}$ and $R^{13}$ is lower alkyl. Using the process of part C of Example 21, other esters of the present invention of formula B′ wherein $R^{12}$ is hydrogen and $R^{13}$ is methyl or other lower alkyl can be prepared using a ketone of formula I ($R^{13}$ is lower alkyl) as the precursor.

(C) Each of the esters of this example and Example 21 can be hydrolyzed to the free acid according to the procedure of Example 5.

EXAMPLE 23

To a solution of 2 g. of methyl 3,7,11-tetramethyltrideca-2,4-dienoate and 20 ml. of dry ether, at −78°, is added slowly 0.4 g. of lithium aluminum hydride in dry ether. The mixture is allowed to stand one hour and then is allowed to warm up to room temperature. Then about 2.5 ml. of acetic acid is added. The mixture is washed with ice water and the ether phase dried and evaporated to yield 3,7,11,11-tetramethyltrideca-2,4-dien-1-ol.

By use of the process of this example, each of the methyl esters under col. V above is reduced to the respective allylic alcohol below:

3,7,11-trimethyldodeca-2,4-dien-1-ol
3,7,11-trimethyltrideca-2,4-dien-1-ol
3,11-dimethyl-7-ethyltrideca-2,4-dien-1-ol
3,7,10-trimethylundeca-2,4-dien-1-ol
3,6,9-trimethyldeca-2,4-dien-1-ol
3,6,9-trimethylundeca-2,4-dien-1-ol
3,8,12-trimethyltrideca-2,4-dien-1-ol
3,8,13-trimethyltetradeca-2,4-dien-1-ol
3,7,13-trimethyltetradeca-2,4-dien-1-ol Each of the esters listed below is reduced using lithium aluminum hydride to yield the respective allylic alcohol.

ethyl 3,7,11,11-tetramethyldodeca-2,4-dienoate
methyl 3,7,10,11-tetramethyldodeca-2,4-dienoate
methyl 3,6,8,9-tetramethyldeca-2,4-dienoate
methyl 3,7,9,10-tetramethylundeca-2,4-dienoate
methyl 3,6,10-trimethylundeca-2,4-dienoate
ethyl 3,5,7,11-tetramethyldodeca-2,4-dienoate
ethyl 3,5,7,10,11-pentamethyldodeca-2,4-dienoate
ethyl 3,5,7,9,10-pentamethyldodeca-2,4-dienoate
3,7,11,11-tetramethyldodeca-2,4-dien-1-ol
3,7,10,11-tetramethyldodeca-2,4-dien-1-ol
3,6,8,9-tetramethyldeca-2,4-dien-1-ol
3,7,9,10-tetramethylundeca-2,4-dien-1-ol
3,6,10-trimethylundeca-2,4-dien-1-ol
3,5,7,11-tetramethyldodeca-2,4-dien-1-ol
3,5,7,10,11-pentamethyldodeca-2,4-dien-1-ol
3,5,7,9,10-pentamethylundeca-2,4-dien-1-ol

EXAMPLE 24

To a mixture of 4 g. of 3,7,11,11-tetramethyltrideca-2,4-dien-1-ol and 25 ml. of ether at −20° is added a solution of 5 ml. of phosphorus tribromide in 18 ml. of ether over about 15 minutes. The mixture is stirred at 0° for approximately one hour and then poured onto ice and extracted with pentane. The organic phase is washed with aqueous sodium bicarbonate, water and then brine, dried over magnesium sulfate and evaporated to yield 1-bromo-3,7,11-tetramethyltrideca-2,4-diene.

The process of this example is repeated using each of the alcohols of Example 23 to prepared the respective bromide, that is 3,7,11-trimethyldodeca-2,4-dienyl bromide
3,7,11-trimethyltrideca-2,4-dienyl bromide
3,11-dimethyl-7-ethyltrideca-2,4-dienyl bromide
3,7,10-trimethylundeca-2,4-dienyl bromide
3,6,9-trimethyldeca-2,4-dienyl bromide
3,6,9-trimethylundeca-2,4-dienyl bromide
3,8,12-trimethyltrideca-2,4-dienyl bromide
3,8,13-trimethyltetradeca-2,4-dienyl bromide
3,7,13-trimethyltetradeca-2,4-dienyl bromide 3,7,11,11-tetramethyldodeca-2,4-dienyl bromide
3,7,10,11-tetramethyldodeca-2,4-dienyl bromide
3,6,8,9-tetramethyldeca-2,4-dienyl bromide
3,7,9,10-tetramethylundeca-2,4-dienyl bromide
3,6,10-trimethylundeca-2,4-dienyl bromide
3,5,7,11-tetramethyldodeca-2,4-dienyl bromide
3,5,7,10,11-pentamethyldodeca-2,4-dienyl bromide
3,5,7,9,10-pentamethylundeca-2,4-dienyl bromide By repeating the process of this example using phosphorus trichloride in place of phosphorus tribromide, the novel allylic chlorides are prepared, e.g.

3,7,11,11-tetramethyltrideca-2,4-dienyl chloride,
3,7,11-trimethyldodeca-2,4-dienyl chloride,
3,7,11-trimethyltrideca-2,4-dienyl chloride,
3,7,10-trimethylundeca-2,4-dienyl chloride,
3,6,9-trimethyldeca-2,4-dienyl chloride,
3,7,10,11-tetramethyldodeca-2,4-dienyl chloride, and
3,5,7,10,11-pentamethyldodeca-2,4-dienyl chloride.

EXAMPLE 25

Ten grams of 1-bromo-3,7,11,11-tetramethyltrideca-2,4-diene is mixed with 50 ml. of benzene, cooled to 5–10° and saturated with ammonia. The resulting mixture is stirred for four hours allowing the temperature to rise to about 20° while maintaining dry conditions. The mixture is washed with dilute sodium hydroxide and then evaporated under reduced pressure to yield 3,7,11,11-tetramethyltrideca-2,4-dienylamine.

By repeating the process of this example using the allylic bromides or chlorides of Example 24 the respective amines are prepared, e.g. 3,7,11-trimethyldodeca-2,4-dienylamine, 3,7,11-trimethyltrideca-2,4-dienylamine, 3,11-dimethyl - 7 - ethyltrideca - 2,4 - dienylamine, 3,7,10-trimethylundeca - 2,4 - dienylamine, 3,6,9 - trimethyldeca-2,4 - dienylamine, 3,7,11,11 - tetramethyldodeca - 2,4-dienylamine, 3,7,10,11 - tetramethyldodeca - 2,4 - dienylamine, 3,6,8,9 - tetramethyldeca - 2,4 - dienylamine, 3,6,10 - trimethylundeca - 2,4 - dienylamine, 3,5,7,11 - tetramethyldodeca - 2,4 - dienylamine, 3,7,9,10 - tetramethylundeca - 2,4 - dienylamine, and 3,5,7,10,11 - pentamethyldodeca-2,4-dienylamine.

EXAMPLE 26

Five grams of 1-bromo-3,7,11,11-tetramethyltrideca-2,4-diene in 25 ml. of benzene is mixed with 4 g. of diethyl-amine and the mixture stirred for about three hours. Methylene chloride (50 ml.) is added and the mixture washed with dilute sodium hydroxide and then water and evaporated to yield N,N-diethyl 3,7,11,11-tetramethyltrideca-2,4-dienylamine.

The process of this example is repeated using either the bromides or chlorides of Example 24 as the starting material to prepare the respective N,N-diethylamine, e.g. N,N-diethyl 3,7,11 - trimethyldodeca - 2,4 - dienylamine, N,N-diethyl 3,7,11 - trimethyltrideca - 2,4 - dienylamine, N,N-diethyl 3,7,10 - trimethylundeca - 2,4 - dienylamine, N,N-diethyl 3,6,9 - trimethyldeca - 2,4 - dienylamine, N,N-diethyl 3,7,10,11 - tetramethyldodeca - 2,4 - dienylamine, N,N-diethyl 3,7,11,11 - tetramethyldodeca - 2,4 - dienylamine, N,N-diethyl 3,6,9 - trimethyldeca - 2,4 - dienylamine, N,N-diethyl 3,7,9,10 - tetramethylundeca - 2,4-dienylamine, N,N-diethyl 3,6,8,9 - tetramethyldeca - 2,4-dienylamine and N,N-diethyl 3,5,7,10,11-pentamethyldodeca-2,4-dienylamine.

Other amines of the present invention of formula A are prepared by use of the foregoing procedure using an amine of the formula

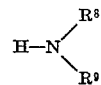

such as dimethylamine, ethylamine, methylamine, pyrrolidine, morpholine, 4-ethylpiperazine, and the like in place of diethylamine. Thus, there is prepared N,N-dimethyl 3,7,11 - trimethyldodeca - 2,4 - dienylamine, N,N-dimethyl 3,7,11-trimethyltrideca-2,4-dienylamine, N-ethyl 3,7,11-trimethyldodeca - 2,4 - dienylamine, N-ethyl 3,7,11 - trimethyltrideca - 2,4 - dienylamine, pyrrolidino 3,7,11 - trimethyldodeca - 2,4 - dienylamine, morpholino 3,7,11-trimethyldodeca - 2,4 - dienylamine, 4' - ethylpiperazino 3,7,11-trimethyldodeca-2,4-dienylamine, etc.

Each of isopropylamine, s-butylamine, di(hydroxyethyl) amine, allylamine, ethenylamine, piperazine, aniline, di(methoxyethyl) amine, cyclohexylamine, isobutylamine, t-amylamine and ethyl-n-propylamine is reacted with 3,7,11-trimethyldodeca-2,4-dienyl bromide or chloride to prepare the respective amine.

N-isopropyl 3,7,11-trimethyldodeca-2,4-dienylamine
N-sec.-butyl 3,7,11-trimethyldodeca-2,4-dienylamine
N,N-di(hydroxyethyl) 3,7,11-trimethyldodeca-2,4-dienylamine
N-allyl 3,7,11-trimethyldodeca-2,4-dienylamine
N-ethenyl 3,7,11-trimethyldodeca-2,4-dienylamine
piperazino 3,7,11-trimethyldodeca-2,4-dienylamine
phenyl 3,7,11-trimethyldodeca-2,4-dienylamine
N,N-di(methoxyethyl) 3,7,11-trimethyldodeca-2,4-dienylamine
N-cyclohexyl 3,7,11-trimethyldodeca-2,4-dienylamine
N-isobutyl 3,7,11-trimethyldodeca-2,4-dienylamine
N-t-amyl 3,7,11-trimethyldodeca-2,4-dienylamine
N-ethyl-N-propyl 3,7,11-trimethyldodeca-2,4-dienylamine

EXAMPLE 27

To a solution of 2 g. of 3,4-methylenedioxyaniline and 10 ml. of dimethylformamide is added 4.5 g. of 3,7,11-trimethyldodeca-2,4-dienyl bromide and 2.5 g. of potassium carbonate. The reaction mixture is heated at about 60° for about 8 hours. After cooling, the mixture is diluted with water and extracted with ether. The ethereal layer is dried over calcium sulfate and evaporated to yield N-3,7,11-trimethyldodeca-2,4-dienyl 3,4-methylenedioxyaniline which can be purified by chromatography.

EXAMPLE 28

A suspension of sodium hydride in mineral oil (0.5 g.) is stirred, under nitrogen, with 15 ml. of dioxane and then 1.5 g. of p-ethylphenyl amine in 10 ml. of dioxane is added. The mixture is stirred and then 3,7,11-trimethyldodeca-2,4-dienyl bromide (3.0 g.) in 15 ml. of dioxane is added and the mixture refluxed for about 2 hours. After cooling, the mixture is filtered and the filtrate evaporated under reduced pressure. The residue is mixed with water and ether and the ether phase separated. The ether and the ether phase is washed with dilute HCl, dried over calcium sulfate and evaporated to yield N-3,7,11-trimethyldodeca-2,4-dienyl p-ethylphenylamine which can be purified by chromatography.

Although not intending to be limited by a theoretical explanation, the effectiveness of the compounds of the present invention to control insects is attributed to the property of these novel compounds to mimic the activity of juvenile hormone as demonstrated herein. While the methods of applying and carriers for conventional insecticides are usually adaptable to the practical use of the compounds of the present invention, the mechanism of action of these novel compounds is unlike that of conventional insects. Whereas conventional insecticides are dependent upon direct knockdown effect, toxicity effect or paralyzing effect; the compounds of this invention achieve control by reason of their ability to inhibit metamorphosis, inhibit reproduction due to abnormal development, break diapause at an unfavorable time, or act as a direct insecticide, particularly at the embryo stage and larvae stage. Treatment of insects in accordance with the present invention can be achieved via ingestion of the active compound in the normal food of the insect and by topical application that is by contact of the epidermis of the insect as by spraying the insect and habitat of the insect or exposure to vapors of the active compound which penetrate into the insect.

The compounds of the present invention can be used in conjunction with other juvenile hormone active substances and conventional insecticides to obtain a broader spectrum of activity or to provide more immediate effect on very heterogeneous populations. Typical insecticides which may be combined with the compounds of the present invention are Malathion, Sevin, Vapona, synthetic and natural pyrethrins, and the like and usually within the ratio of between 10:1 to 1:10, by weight.

What is claimed is:

1. A compound selected from those of the following formula:

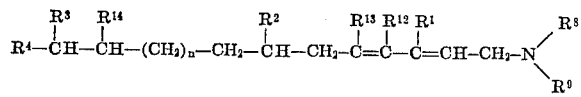

wherein, $n$ is zero or the positive integer one;

each of $R^1$, $R^2$ and $R^4$ is lower alkyl;

each of $R^3$, $R^{12}$, $R^{13}$ and $R^{14}$ is hydrogen or lower alkyl; and each of $R^8$ and $R^9$ is hydrogen or lower alkyl.

2. A compound according to Claim 1 wherein each of $R^1$, $R^2$ and $R^3$ is methyl or ethyl and each of $R^{12}$, $R^{13}$ and $R^{14}$ is hydrogen or methyl.

3. A compound according to Claim 2 wherein $R^4$ is methyl or ethyl and each of $R^{12}$ and $R^{13}$ is hydrogen.

4. A compound according to Claim 3 wherein $n$ is one; $R^{14}$ is hydrogen; and each of $R^1$, $R^2$ and $R^3$ is methyl.

5. A compound according to Claim 4 wherein each of $R^8$ and $R^9$ is hydrogen, methyl or ethyl.

6. A compound according to Claim 5 wherein each of $R^8$ and $R^9$ is ethyl.

7. A compound according to Claim 5 wherein $R^8$ is hydrogen and $R^9$ is ethyl.

8. The compound, N-ethyl 3,7,11-trimethyldodeca-2,4-dienylamine, according to Claim 7.

9. The compound, N,N-diethyl 3,7,11-trimethyldodeca-2,4-dienylamine, according to Claim 6.

References Cited

UNITED STATES PATENTS

| | | | |
|---|---|---|---|
| 3,649,590 | 3/1972 | Siddall | 260—404 |
| 3,692,851 | 9/1972 | Hendrick et al. | 260—404 |
| 3,541,154 | 11/1970 | Schmialek et al. | 260—583 H |

LEWIS GOTTS, Primary Examiner

D. R. PHILLIPS, Assistant Examiner

U.S. Cl. X.R.

260—247, 268 R, 293.51, 326.8, 486 R, 570 SR, 576, 577, 634 R; 424—325

UNITED STATES PATENT OFFICE
CERTIFICATE OF CORRECTION

Patent No. 3,824,290            Dated July 16, 1974

Inventor(s) Clive A. Henrick

It is certified that error appears in the above-identified patent and that said Letters Patent are hereby corrected as shown below:

In Claim 1, "each of $R^2$, $R^{12}$, $R^{13}$ and $R^{14}$ is hydrogen or lower alkyl;" should read --each of $R^3$, $R^{12}$, $R^{13}$ and $R^{14}$ is hydrogen or lower alkyl;--.

Signed and sealed this 8th day of October 1974.

(SEAL)
Attest:

McCOY M. GIBSON JR.           C. MARSHALL DANN
Attesting Officer             Commissioner of Patents